Figure 5:
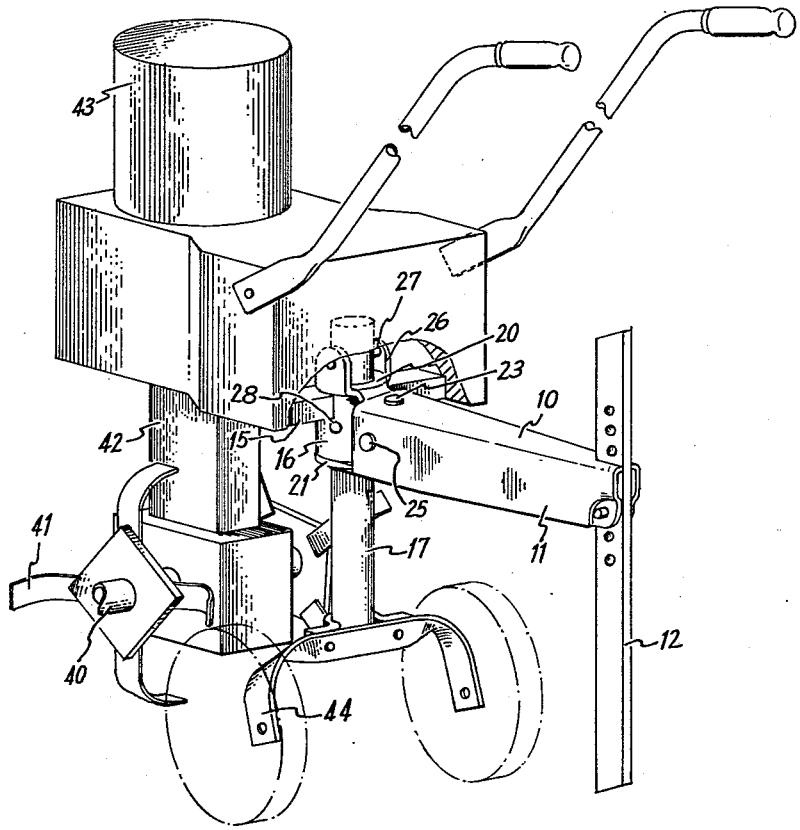

Jan. 22, 1963 F. H. FIELD 3,074,491
STABILIZER STAKE FOR GARDEN TILLERS
Filed Aug. 30, 1960 2 Sheets-Sheet 1
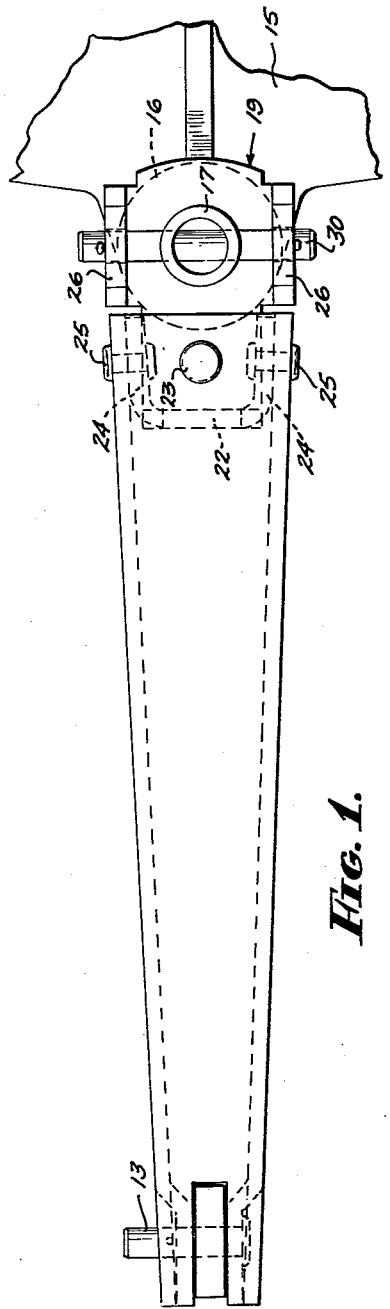
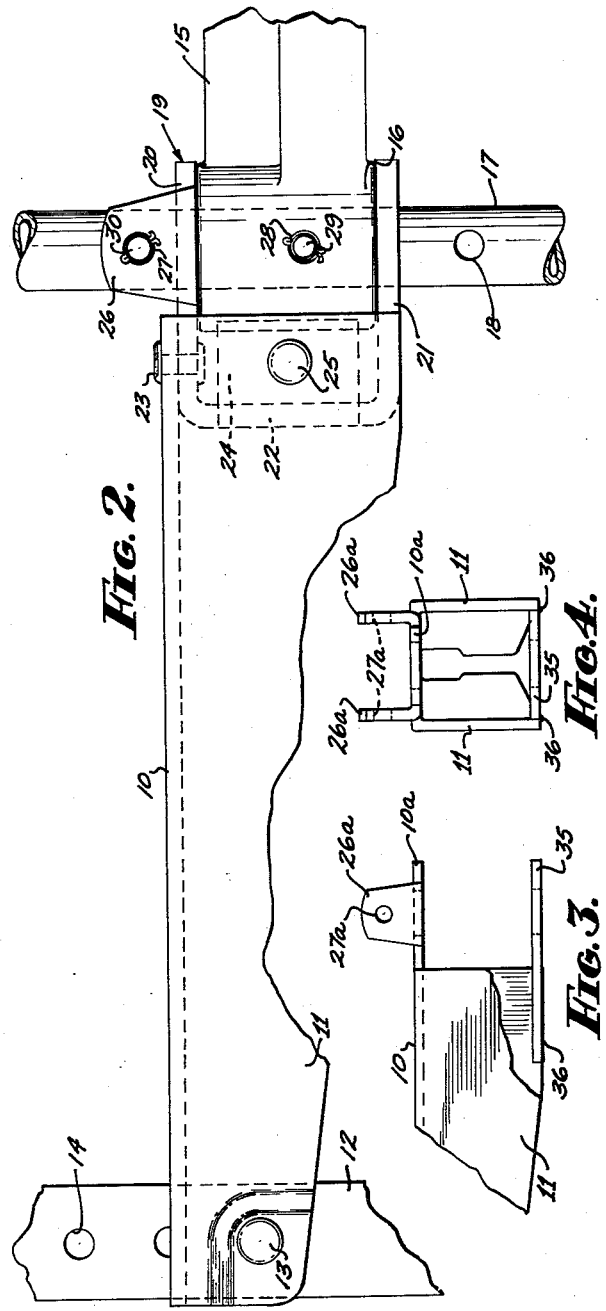
INVENTOR.
FRANK H. FIELD,
BY
Allen + Allen
ATTORNEYS.

INVENTOR.
FRANK H. FIELD,

United States Patent Office 3,074,491
Patented Jan. 22, 1963

3,074,491
STABILIZER STAKE FOR GARDEN TILLERS
Frank H. Field, Cincinnati, Ohio, assignor, by mesne assignments, to Magna American Corporation, Cincinnati, Ohio, a corporation of Ohio
Filed Aug. 30, 1960, Ser. No. 52,964
3 Claims. (Cl. 172—395)

This invention resides in the provision of means whereby different arrangements among the tilling means, transport assembly and rearwardly disposed stake of garden tiller units may be effected.

In recent years garden tiller units have become very popular. These units are usually comprised of a frame on which is mounted a motor to drive a tine shaft having a plurality of earth working tines mounted thereon. To the rear of the frame there is usually a stake which is often used as a brake or drag in order to regulate the depths to which the tines work. In more recent times it has been the practice to include a transport assembly comprised of a pair of wheels mounted on a vertically disposed shaft and usually adjustable vertically with respect to the frame. Some persons employ these wheels only in moving the tiller unit from place to place to save wear and tear on the tines while other persons use the transport assembly even while tilling operations are being performed.

The primary object of this invention is to provide a simple arrangement whereby the tilling means, transport assembly and stake may be fixed with respect to one another or, if desired, the tilling unit and transport assembly may be fixed with respect to each other while the stake may be swiveled with respect to such tilling means and transport assembly or, if desired, the transport assembly and stake may be fixed with respect to each other while such transport assembly and stake may pivot together with respect to the tilling unit.

This and other objects and advantages of the invention will become apparent to those skilled in the art from the description to follow and with reference to the accompanying drawings, in which drawings like numerals are employed to designate like parts and in which:

FIGURE 1 is a top plan view, with parts broken away, of a unit embodying the invention, FIGURE 2 is a side elevation, with parts broken away, showing the invention, FIGURE 3 is a fragmentary side elevation of a modification of certain parts of the invention, FIGURE 4 is an end view taken from the right side of FIGURE 3, and FIGURE 5 is a perspective view of a conventional tiller unit and transport assembly to which the invention is applied.

The garden tiller to which this invention has been applied includes an elongated stabilizer assembly formed of an inverted U-shaped member including the top member 10 and sides 11. At the rear of this member, which is shown at the left hand side of FIGURES 1 and 2, a stake or stabilizer 12 is mounted by means of a pin 13. Depending on which of the holes 14 is brought into alignment with the pin 13, vertical adjustment of the stake 12 is effected. The tiller unit also includes a casting 15 (see FIGURES 1 and 2) and the tine shaft and tines, the housing for the transmission means from the tines to the motor, and a suitable base to which the motor may be secured. The tine shaft, tines, transmission housing and motor have been generally indicated in FIGURE 5 at 40, 41, 42 and 43 respectively; these are old and well known in the art. Suffice it to say that they are either included in or carried by the casting 15.

The casting 15 terminates in a hub 16 which is bored to receive the shaft 17 of the transport assembly 44, this shaft being slidable within the hub 16. It will be understood that the transport assembly 44 includes a pair of wheels. The shaft 17 has a plurality of holes 18 therein which permit vertical adjustment of the wheels with respect to the tilling unit as represented by the casting 15 and for other purposes which will be described shortly.

Fixed within the right hand end, as viewed in FIGURES 1 and 2, of the U-shaped stabilizer assembly 10—11 is another U-shaped member generally indicated at 19. The member 19 includes a top plate 20 and a bottom plate 21, both of which are provided with holes through which the shaft 17 may slide nicely. That part of the member 19 which joins the top and bottom plates 20 and 21 is indicated at 22. The top plate 20 may be riveted to the top member 10 of the stabilizer assembly 10—11 as is indicated at 23. In addition, a pair of wing plates 24 are bent from the member 22 and riveted to the side 11 of the stabilizer assembly 10—11 as indicated at 25. In this manner the member 19 is securely fixed to the stabilizer assembly 10—11.

A pair of lugs or ears 26 are bent from the top plate 20 and extend vertically therefrom. Pin receiving holes 27 are provided in these ears 26. It should also be noted that a pin receiving hole 28 is provided in the hub 16 of the casting 15. A pin 29 may be employed to pass through the hole 28 in the hub 16 and through one of the holes 18 of the transport assembly shaft 17. Also, a pin 30 may be employed to pass through the holes 27 in the ears 26 and one of the holes 18 of the shaft 17.

The operation of the invention is as follows. When it is desired, once a desired height for the wheels of the transport assembly has been selected, to fix the relationship among the tilling unit 15, transport assembly shaft 17 and stake 12, the pin 29 is inserted through the hole 28 of the hub 16 and the hole 18 of the shaft 17 which is aligned therewith, and the pin 30 is also inserted through the holes 27 of the ears 26 and the hole 18 of the shaft 17 which is aligned therewith. Either of the pins 29 and 30 may be used to regulate the height of the wheels on the shaft 17 depending on which of holes 18 is used. The pin 29, however, has the additional function of preventing any relative movement between the hub 16 and shaft 17, or in other words, this pin 29 fixes the relationship between the transport wheels and tilling unit. The pin 30, however, fixes relative movement between the shaft 17 and stabilizer assembly 10—11 in which the stake 12 is mounted, thus the pin 30 fixes the relative position of the transport wheels with respect to the stake. When both pins 29 and 30 are in place as indicated it will be apparent that the relationship among the tilling unit 15, transport assembly shaft 17 and stake 12 is fixed.

When it is desired to permit the stake 12 to swivel with respect to the tilling unit 15 and transport assembly shaft 17, only the pin 29 is employed. This pin fixes the position of the hub 16 on the shaft 17. In the absence of the pin 30, however, the stabilizer assembly 10—11 which carries the stake 12 may be rotated or swiveled about the shaft 17, it being noted that the plates 20 and 21 straddle the hub 16 and, of course, receive the shaft 17 therethrough as earlier described.

When it is desired to fix the relative position of the stake 12 with respect to the transport assembly shaft 17 while permitting the tilling unit 15 to pivot with respect to such fixed shaft 17 and stake 12, only the pin 30 is used. This pin will fix the vertical position of the tilling unit 15 with respect to the shaft 17 since the hub 16 is located between the plates 20 and 21 of the member 19. In the absence of the pin 29, however, the hub 16 may rotate about the shaft 17. The pin 30 prevents rotation of the stabilizer assembly 10—11, and the stake 12 carried thereby, about the shaft 17.

Referring now to FIGURES 3 and 4 a modification of the invention is shown. In this modification the ears 26a are formed or bent directly from an extension 10a of the upper plate 10 of the U-shaped stabilizer assembly 10—11. Holes 27a, to receive the pin 30, are provided in the ears 26a. The extension 10a is also provided with a hole through which the shaft 17 will slide nicely. A plate 35 is welded, as indicated at 36, between the side members 11 of the U-shaped stabilizer assembly 10—11. This plate 35 also has a hole, in alignment with that provided in the extension 10a, to slideably receive the shaft 17. It will be apparent that the operation of this modification is the same as that described in connection with that of FIGURES 1 and 2.

From the above description it is apparent that this invention permits a variety of relationships among the tilling unit, transport assembly and stake employed in garden tillers. Although the invention has been described in terms of particular structures and arrangements, these structures and arrangements are not to constitute a limitation on the invention except insofar as they are specifically set forth in the subjoined claims. It will be obvious to those skilled in the art that modifications may be made in the invention without departing from the scope and spirit thereof.

Having thus described the invention, what is claimed as new and what is desired to be protected by United States Letters Patent is:

1. In a garden tiller comprised of a tilling unit, a transport assembly, a stabilizer assembly and a stake mounted on said stabilizer assembly, the improvement which includes: a vertical shaft on which said transport assembly is mounted, said shaft being provided with a plurality of pin receiving holes; a hub fixed to said tilling unit, said hub having a bore which receives said shaft and a pin receiving hole adapted to be aligned with a selected one of said holes in said shaft; means fixed to said stabilizer assembly and including a pair of horizontal plates having holes which receive said shaft, said hub when on said shaft being located between said plates, and a pair of upstanding members on one of said plates disposed on opposite sides of said shaft, said members having pin receiving holes adapted to be aligned with a selected one of the said holes in said shaft; and a pin placed through a selected hole of said shaft and the hole aligned therewith; whereby when the said pin passes through the aligned pin receiving holes in said hub and said shaft, said stabilizer assembly is free to rotate about said shaft, and when the said pin passes through the aligned pin receiving holes in said members and said shaft, said hub is free to rotate on said shaft.

2. The tiller of claim 1 in which the means fixed to said stabilizer assembly comprises a generally U-shaped member, the said horizontal plates constituting the legs of the U, a plate-like member joining said plates and constituting the bridge of the U, a pair of wing plates fixed to said plate-like member, means fixing one of said horizontal plates to the stabilizer assembly, and means fixing said wing plates to said stabilizer assembly.

3. The improvement of claim 1 in which the said pair of horizontal plates fixed to said stabilizer assembly includes a first plate which is an extension of said stabilizer assembly and a second plate which is welded to said stabilizer assembly.

References Cited in the file of this patent
UNITED STATES PATENTS

| | | |
|---|---|---|
| 2,375,137 | Rutishauser | May 1, 1945 |
| 2,803,183 | Smithburn | Aug. 20, 1957 |
| 2,827,842 | Peterson et al. | Mar. 25, 1958 |
| 2,847,924 | Quick | Aug. 19, 1958 |

FOREIGN PATENTS

| | | |
|---|---|---|
| 56,427 | Netherlands | June 15, 1944 |